United States Patent [19]
Williams et al.

[11] Patent Number: 5,768,096
[45] Date of Patent: Jun. 16, 1998

[54] PORTABLE COMPUTER WITH MOVABLE DISPLAY PANELS FORMING A CONCATENATED DISPLAY SCREEN IN RESPONSE TO OPENING THE COMPUTER

[75] Inventors: David A. Williams, Corvallis; Daniel I. Croft, Monmouth, both of Oreg.; Stephen J. Brown, Vancouver, Wash.; Jacques H. Helot, Corvallis, Oreg.

[73] Assignee: Hewlett-Packard Company, Palo Alto, Calif.

[21] Appl. No.: 739,978

[22] Filed: Oct. 30, 1996

[51] Int. Cl.⁶ .............................. G06F 1/16; H05K 5/02
[52] U.S. Cl. ........................................................ 361/681
[58] Field of Search ..................... 364/708.1; 361/681, 361/682

[56] References Cited

U.S. PATENT DOCUMENTS

| | | |
|---|---|---|
| 3,307,175 | 2/1967 | Shill . |
| 3,987,299 | 10/1976 | Mulder . |
| 4,139,261 | 2/1979 | Hilsum . |
| 4,154,501 | 5/1979 | Fischer . |
| 4,173,391 | 11/1979 | Schure et al. . |
| 4,650,280 | 3/1987 | Sedlmayr . |
| 4,904,049 | 2/1990 | Hegg . |
| 4,911,528 | 3/1990 | Polaert . |
| 5,009,475 | 4/1991 | Knudson . |
| 5,128,662 | 7/1992 | Failla ............................ 361/681 X |
| 5,438,484 | 8/1995 | Kanda et al. . |
| 5,455,882 | 10/1995 | Veligdan . |
| 5,465,315 | 11/1995 | Sakai et al. . |
| 5,629,833 | 5/1997 | Ido et al. ............................. 361/681 |

*Primary Examiner*—Michael W. Phillips

[57] ABSTRACT

A composite display is provided having display panels which move into and out of a viewing position. While in the viewing position the display panels form a concatenated display screen. The display panels are stored within a display housing with respective viewing areas being at least partially overlapped to reduce storage space. The display panels automatically move out of the storage position into the viewing position in a notebook computer configuration when opening the computer. Similarly, the display panels automatically move into the storage position when closing the computer. The display unit includes a post. A system unit includes a cam. The cam defines a track within which the post moves. While the display unit rotates from the closed position to the open position the post moves along the track causing a display to move into its viewing position.

13 Claims, 4 Drawing Sheets

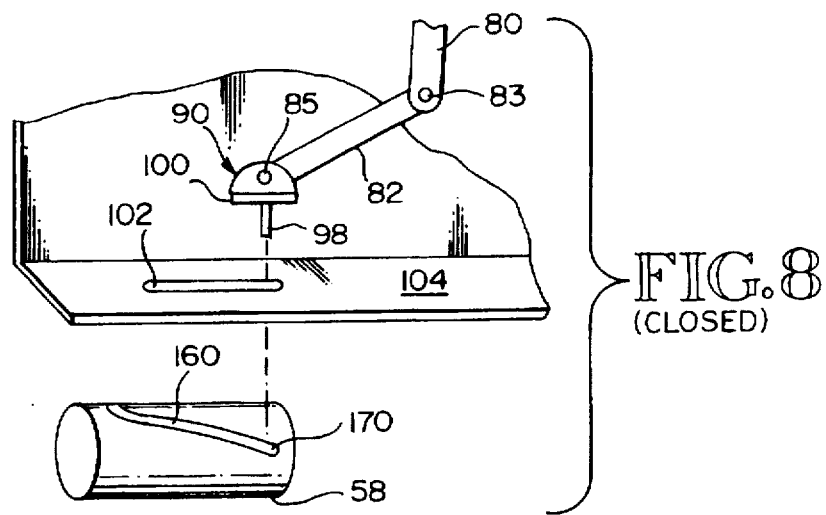
FIG. 8 (CLOSED)
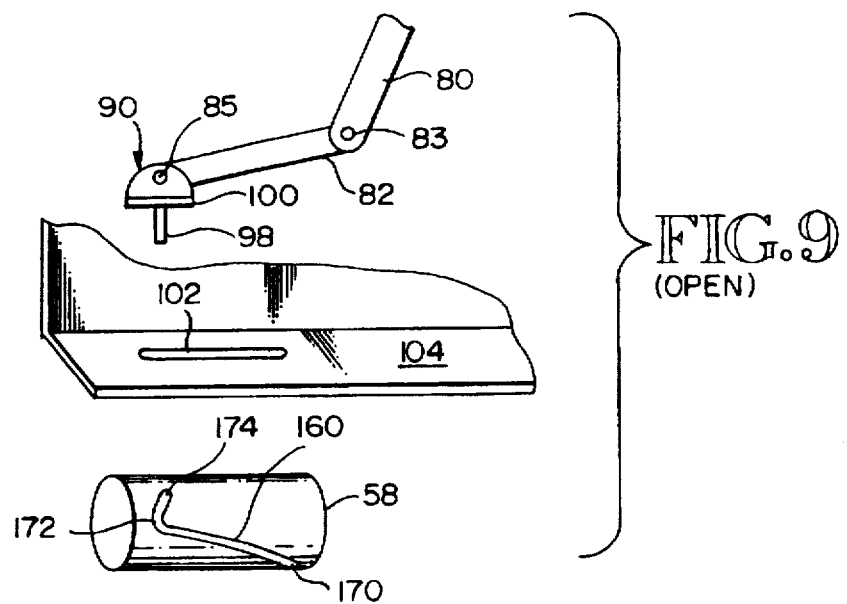
FIG. 9 (OPEN)
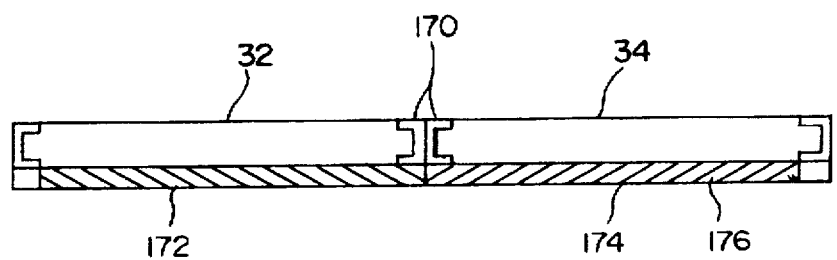
FIG. 10

PORTABLE COMPUTER WITH MOVABLE DISPLAY PANELS FORMING A CONCATENATED DISPLAY SCREEN IN RESPONSE TO OPENING THE COMPUTER

BACKGROUND OF THE INVENTION

This invention relates generally to display panels and portable computers having a display panel, and more particularly to a method and apparatus for moving multiple display panels into and out of a concatenated viewing position.

There are many types of general purpose and specialized computers used for a variety of computing applications. The personal computer and computer work station are popular computer system architectures available in many different configurations having any of several different processors (e.g., 80386, 80486, 586, PENTIUM™, PowerPC™, Alpha) and operating systems (e.g., DOS, Windows 95, Windows NT, UNIX, MAC-OS, OS/2). Different categories by case size, include desktop computer, laptop computer, notebook computer and palm-top or hand-held computer. The laptop, notebook, and palm-top or hand-held computers also are referred to as portable computers.

A portable computer is a popular configuration enabling increased mobility for a user. Typically, a processor board, display and keyboard are integrated into a common case. A notebook computer case typically includes a display unit and a system unit permanently attached via a hinged relationship. A flat panel display is mounted within the display unit. A keyboard, motherboard, data storage unit(s), expansion slot(s), and I/O ports are mounted in the system unit. Modular peripheral units such as a floppy drive, hard drive, CD-ROM drive, modem or PC card are removably installed from the case. A conventional notebook computer is approximately the size of a standard sheet of paper (e.g., 21.6 cm by 27.9 cm; or in English units—8.5 inches by 11.0 inches) and weighs under six pounds. The thickness of such a notebook computer typically is 4.5 cm to 6.0 cm.

Conventional notebook computers and other portable computers typically include a single viewing screen formed by a single display panel. U.S. Pat. No. 5,465,315 and U.S. Pat. No. 4,139,261, each disclose a plurality of display panels arranged to collectively form a composite display of increased area. An array of fiber optics is provided adjacent to the array of display panels between a viewer and the display panel. The fiber optic array serves to eliminate discontinuities in a viewed image at the borders between respective display panels.

SUMMARY OF THE INVENTION

According to the invention, an improved composite display is provided having display panels which move into and out of a viewing position. While in the viewing position the display panels form a concatenated display screen.

According to one aspect of the invention the display panels are stored within a display housing with respective viewing areas being at least partially overlapped to reduce storage space. This is particularly advantageous for a notebook or other portable computer configuration where a small volume is desired during transport and an enlarged viewing area is desired during operation.

According to another aspect of the invention, the display panels automatically move out of the storage position into the viewing position. In a notebook computer configuration a display unit rotates relative to a system unit between an open position for viewing the composite display screen and a closed position at which the display screen is blocked from view. While moving the display unit into the open position the display panels automatically move into the viewing position. Similarly, while moving the display unit into the closed position the display panels automatically move into the storage position.

According to another aspect of the invention, the display unit includes a post and the system unit includes a cam at a hinge to the display unit. The cam defines a track within which the post moves. While the display unit rotates from the closed position to the open position a force derived from the rotation action is translated onto the post forcing the post to move along the track. The movement of the post along the track causes a corresponding display panel into its viewing position.

According to another aspect of the invention, the post is a first extension from the display unit and the track is a first track. Also, at least one display panel moves. For example, a first display panel moves between the viewing position and the storage position. The first display panel includes a second extension, a third extension, and a fourth extension. The display unit also includes a first member defining a second track for the second extension, and a second member defining a third track for the third extension and a fourth track for the first extension. The first member is fixed relative to the housing. The second member also is fixed relative to the housing. A link couples the first extension to the fourth extension. During rotation of the display unit from the closed position into the open position, the force translated onto the first extension is further translated via the link to the fourth extension. The force on the fourth extension causes movement of the first display panel assembly. During the movement of the display panel assembly the second extension moves within the second track, the third extension moves within the third track and the first extension moves within the fourth track.

One advantage of the invention is that an enlarged display screen is provided without significantly increasing the size of the computer case to be transported. Another advantage is that the movement into and out of the expanded viewing position is achieved automatically as the computer is open or closed. These and other aspects and advantages of the invention will be better understood by reference to the following detailed description taken in conjunction with the accompanying drawings.

BRIEF DESCRIPTION OF THE DRAWINGS

FIG. 8 shows a partial view of a display unit post which runs within a track of a cam on a hinge element for the close position of the display unit;

FIG. 9 shows a partial view of a display unit post which runs within a track of a cam on a hinge element for the open position of the display unit; and FIG. 10 shows a cross-sectional view of the display panel of FIG. 2.

DESCRIPTION OF SPECIFIC EMBODIMENTS

Overview

Figure 1:
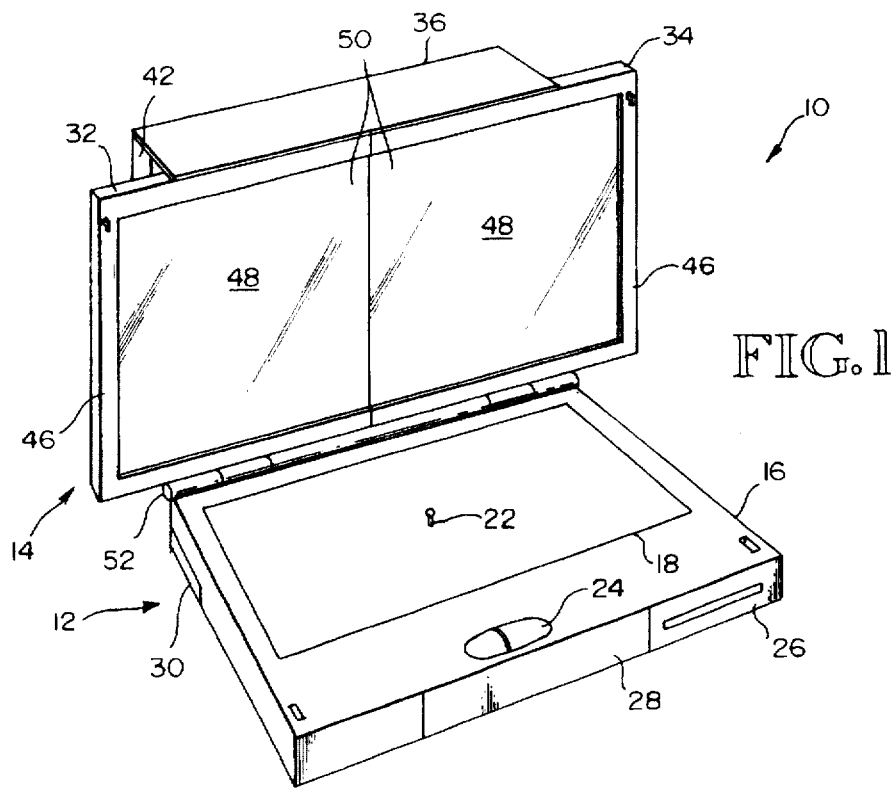
FIG. 1 is a perspective view of a computer in an open position with display panels extended into a viewing position according to an embodiment of this invention.
Figure 2:
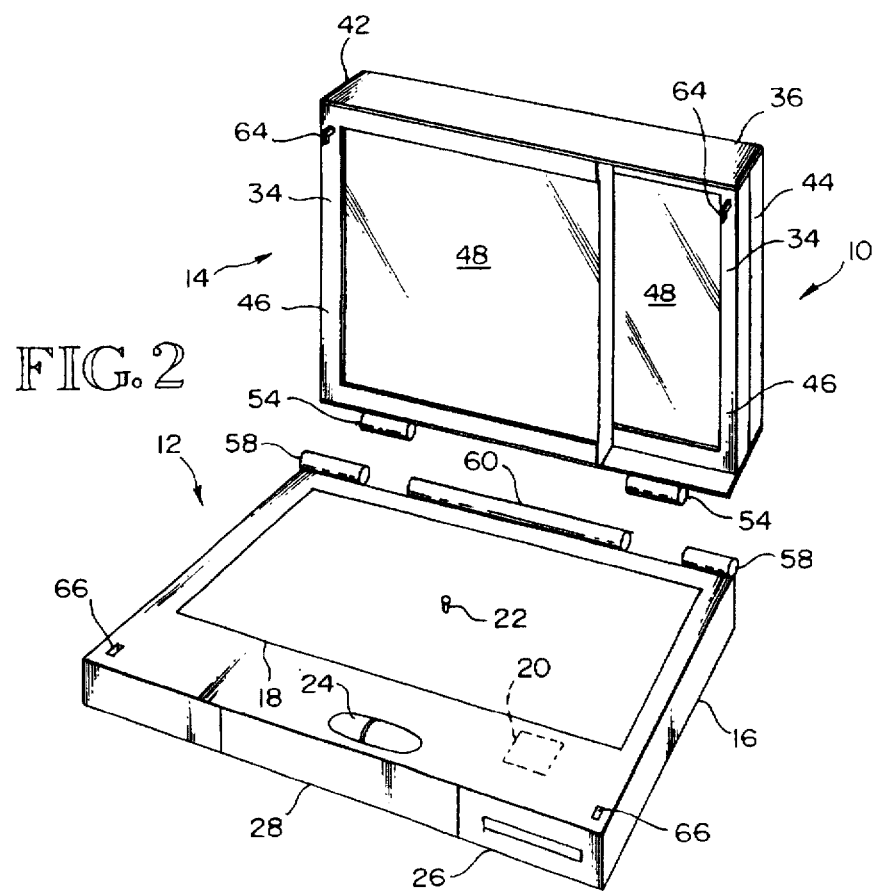
FIG. 2 is an exploded view of the display unit and the system unit of FIG. 1 showing display panels retracted into a storage position according to an embodiment of this invention.
Figure 3:
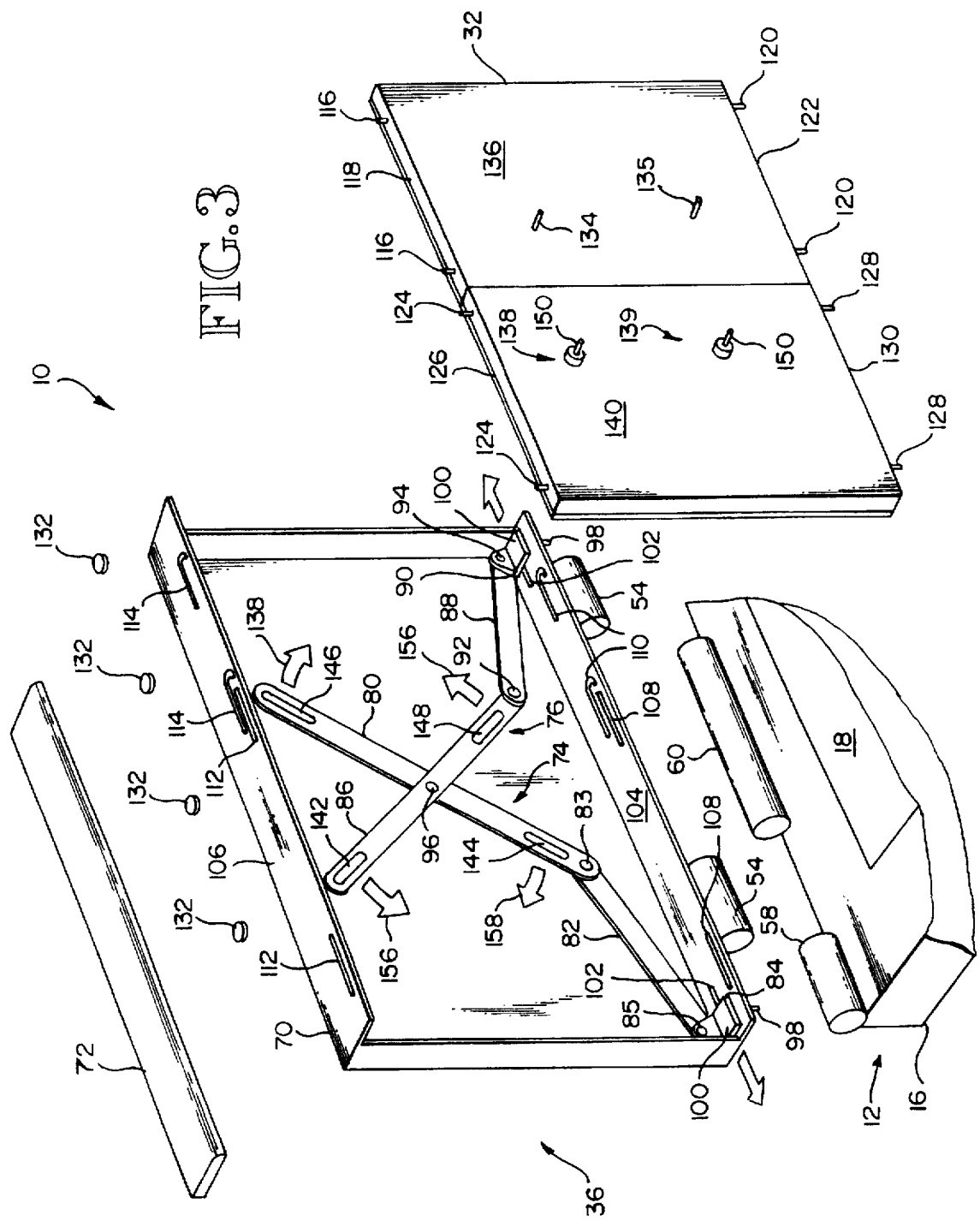
FIG. 3 is an exploded view of the display unit of FIG. 1 and a partial view of the system unit of FIG. 1.

FIGS. 1–3 show a computer 10 according to an embodiment of this invention. The computer 10 includes a system unit 12 and a display unit 14. The system unit 12 includes a housing 16, keyboard 18, and processor 20. In some embodiments the system unit 12 also includes a pointing device 22 (e.g., mouse, trackball, touchpad, eraser head), clicking device 24, a floppy disk drive 26, a hard disk drive 28, and a battery 30. The display unit 14 includes two display panels 32, 34 and a display housing 36. The computer 10 embodies a proprietary work station, personal computer, PENTIUM computer, APPLE MACINTOSH computer, or other computer currently available or to come based on the Intel 80X86 architecture, Motorola 68XXX architecture, PowerPC architecture or other CISC processor architectures, RISC processor architectures and other single or multiple multiprocessor architectures. Alternatively the computer 10 embodies simpler architectures for hand-held computing devices or INTERNET communication devices. Illustrated in FIGS. 1–3 is a portable computer in a notebook computer case.

The display panels 32, 34 move between an extended viewing position as shown in FIG. 1 and an overlapping storage position as shown in FIG. 2. The display housing 36 has peripheral side edges 42, 44. In the extended viewing position, the display panel 32 extends beyond the peripheral edge 42 and the display panel 34 extends beyond the peripheral edge 44. Each display panel 32, 34 includes a border area 46 and a viewing area 48. While in the viewing position, the respective viewing areas are concatenated to form a composite display screen 50. In the storage position the display panels 32, 34 are stacked one behind the other with the respective viewing areas 48 at least partially overlapping as shown in FIG. 2.

In the notebook computer and other portable computer embodiments the display unit 14 is attached to the system unit 12 via a hinge assembly 52. The hinge assembly includes hinge elements 54 at the display unit 14 and cams 58 and hinge element 60 at the system unit 12. The display unit 14 rotates relative to the system unit 12 between an open position and a closed position via the hinge assembly 52. In the open position the display panel viewing areas 48 generally face a user sitting before the computer 10. Typically the display unit 14 defines an angle of 90° or more with the system unit 12. In the closed position the display unit 12 is flush and generally parallel with the system unit 14. The display panel viewing areas 48 are blocked from view by the system unit 12. One or more latches 64 at the display unit 14 mate to corresponding latch openings 66 at the system unit 12 to hold the display unit closed to the system unit.

Display Panel Movement Mechanism

Referring to FIG. 3, the display housing 36 includes a base housing 70, a cover plate 72, and two linkage assembly 74, 76. A first linkage assembly 74 is formed by an outer link 80, an inner link 82 and a nodal structure 84. One joint 83 occurs between the inner link 82 and the outer link 80. Another joint 85 occurs between the inner link 82 and the nodal structure 84. Similarly, the second linkage assembly 76 is formed by an outer link 86, an inner link 88 and a nodal structure 90. One joint 92 occurs between the inner link 88 and the outer link 86. Another joint 94 occurs between the inner link 88 and the nodal structure 90. The outer links 80, 86 of the two linkage assemblies 74, 76 are coupled at an intermediary position along each link's length to define another joint 96. Each nodal structure 84, 90 includes a post 98 extending from the display unit 14 toward the system unit 12 and a nodal plate 100 to which the post 98 is fixed. The posts 98 move within a track 102 at a lower member 104 of the base housing 70. As the posts 98 move within the tracks 102 the nodal structures 84, 90 move, which in turn cause the outer links 80, 86 to rotate relative to their common joint 96.

The base housing 70 includes the lower member 104 and an upper member 106. In addition to defining the tracks 102, the lower member also defines a pair of tracks 108 and a pair of tracks 110. Similarly the upper member 106 defines a pair of tracks 112 and a pair of tracks 114. The tracks 108, 112 straight tracks have generally the same length. The tracks 110, 114 each have a straight portion and a curved portion and define generally the same shape. The tracks 108, 112 define the path of motion for the display panel 32. The tracks 110, 114 define the path of motion for the display panel 34.

Display panel 32 includes a pair of posts 116 extending from a first peripheral edge 118 and a second pair of posts extending from a second peripheral edge 120. Similarly, the display panel 34 includes a pair of posts 124 extending from a first peripheral edge 126 and a second pair of posts 128 extending from a second peripheral edge 130. The posts 116 extend into the tracks 112. The posts 120 extend into the tracks 108. The posts 124 extend into the tracks 114. The posts 128 extend into the tracks 110. The posts 116, 124 are capped with caps 132 which prevent the posts 116, 124 from escaping beneath the corresponding tracks 112, 114 in which they run.

Display panel 32 further includes a pair of posts 134,135 extending from a back surface 136 opposite the viewing area 48. The posts 134, 135 extend into corresponding tracks 142, 144 of the link assemblies 74, 76. The outer link 80 of the first linkage assembly 74 defines two tracks 144, 146. Similarly the outer link 86 of the second linkage assembly 76 also defines two tracks 142, 148. Post 134 extends into track 142 of outer link 86. Post 135 extends into track 144 of outer link 80.

Display panel 34 further includes a pair of extendable posts 138, 139 extending from a back surface 140 opposite the viewing area 48. Post 138 extends into track 146 of outer link 80. Post 139 extends into track 148 of outer link 86. The extendable posts 138, 139 each include a post section 150 movable between a retracted length and an extended length. The post section 150 are biased to the extended length. The posts 116, 120, 134, 135 are fixed relative to the display panel 32. The posts 124, 128, 138, 139 are fixed relative to the display panel 34. Posts 138, 139 have a varying length extending outward from the display panel 34.

Display Panel Motion

Figure 4:
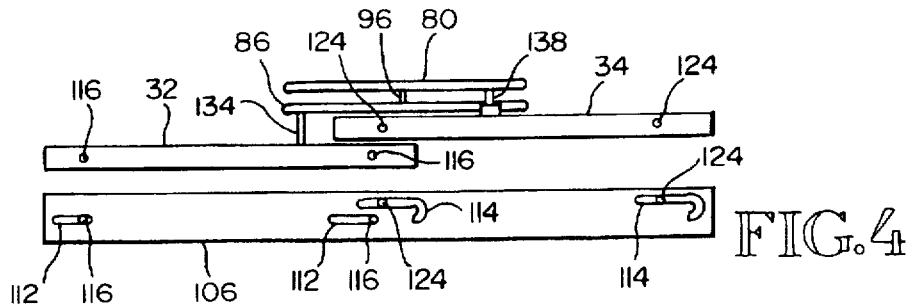
FIG. 4 shows a diagram of the display panel storage positions and display panel posts within corresponding tracks for the storage position.
Figure 5:
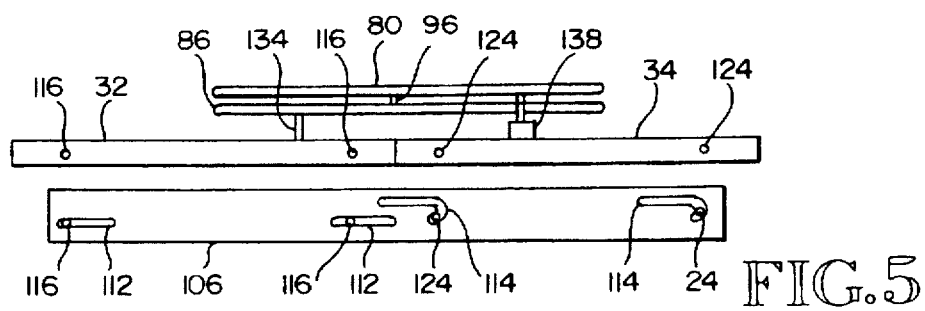
FIG. 5 shows a diagram of the display panel viewing positions and display panel posts within corresponding tracks for the viewing position.
Figure 6:
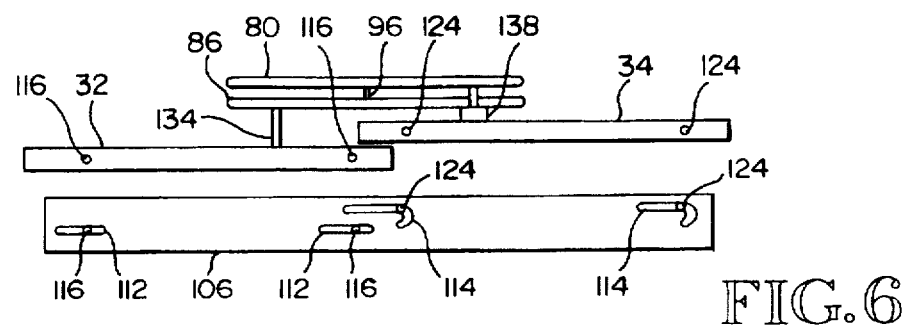
FIG. 6 shows a diagram of the display panels at an intermediary position and display panel posts within corresponding tracks for such intermediary position.
Figure 7:
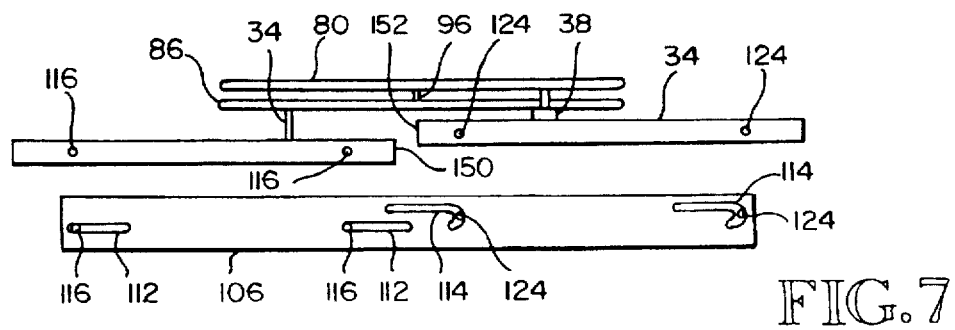
FIG. 7 shows a diagram of the display panels at their most extended position and display panel posts within corresponding tracks for such position.

FIGS. 4–7 show the display panels 32 at various positions. FIG. 4 shows the display panels 32, 34 in the storage position in which the panels 32, 34 overlap. FIG. 5 shows the display panels 32, 34 in the viewing position with the display panels aligned to form a concatenated viewing area. In the storage position of FIG. 4 the outer links 80, 86 are at a first orientation relative to the joint 96, the posts 112 are in a first position relative to their respective tracks 112, and the posts 138 are in a first position relative to their respective tracks 114. FIG. 6 shows an intermediary position in which the display panels 32, 34 have moved, but still partially overlap. Note that the posts 116 have moved along the tracks 112 relative to in FIG. 4. Also note that the posts 124 have moved along a straight portion of their respective tracks 114. FIG. 7 shows the display panels 32, 34 spread to the farthest extent. Note that posts 116 have reached the end of tracks 112. Note that posts 124 have moved to the apex of the curved portion of tracks 114. In FIG. 7 the panels 32, 34 do not overlap and are shown having a gap between adjacent edges 150, 152. Also, note that the display panel 34 is beginning to move forward toward alignment with display panel 32. FIG. 5 shows the viewing position in which the posts 124 have travelled to the end of corresponding tracks 114. Note that posts 112 have moved away from the furthest extend along track 112. Although the movement of the posts 116, 124 with respect to tracks 112, 114 of upper member 106 has been described, there is a corresponding motion of posts 120, 128 with respect to tracks 108, 110 of lower member 104.

Referring to FIG. 3, to move the display panels 32, 34 from the storage position into the viewing position the outer link 80 is rotated in the direction 158, while the outer link 86 is rotated in the direction 156. Such motion forces the posts 134, 135, 138, 139 to travel along respective tracks 142, 144, 146, 148 sliding the display panels 32, 34 apart. Conversely, rotation of the outer links in the opposite directions forces the posts 134, 135, 138, 139 to travel in opposite direction along the tracks 142, 144, 146, 148 sliding the display panels 132, 134 first away from each other then toward each other into an overlapping storage position.

To force the outer links 80, 86 to move in first directions 156, 158 or in directions opposite such first directions the posts 98 in nodal structures 90 travel within respective tracks 160 of a cam 58. FIGS. 8 and 9 show the relationship between a post 98 and a cam 58. The cam 58 has a cylindrical shape with the track 160 running along the surface of the cylinder. As the track 160 extends along the length of the cylinder the angular location of the track varies. When the display unit 14 is in a closed position relative to the system unit 12, the post 98 is at a first position along track 102 of lower member 104 and in a first position 170 within track 160 of cam 58. As the display unit 14 is moved out of the closed position toward an open position, the display unit rotates relative to the system unit 12. The cam 58, however, remains stationary. The rotation of the display unit 14 moves the angular position of the post 98 relative to the cam 58 and thus relative to track 160. To achieve the new angular position the post 98 is forced to move along track 102 following the path determined by track 160. As the angular relationship between the display unit 14 and system unit 12 continues to increase, post 98 achieves a most distal position 172 along tracks 102 and 160. Track 160 then begins to run partially back along its length causing post 98 to then move back along track 102. When the display reaches the open position the post 98 has moved into a final position 174 at the end of track 160.

The movement of the post along track 102 causes the linkage assemblies 74, 76 to alter their orientations. Specifically, the movement of posts 98 changes the angle between outer links 80, 86. This forces the posts 134, 135, 138, 139 to move within respective tracks 142, 144, 146, 148 automatically sliding the display panels 32, 34 apart or together, and thus automatically moving the display panels 32, 34 between the storage position and the viewing position.

Concatenated Display

The display panels 32, 34 each have a border area 46 at peripheral edges. Referring to FIG. 10 there is a small border area 170 where the two display panels 32, 34 meet. Because display pixels are not visible to a viewer at such area 170, a discontinuity could occur in the displayed image. To avoid such discontinuity respective fiber optic face plates 172, 174 are fixed to the display panels 32, 34. Each face plate 172, 174 includes an array of fiber optics 176. Each fiber optic 176 runs from a viewing area 48 of a display panel 32/34 to a distal surface location along the face plate 172/174. To avoid discontinuities at the border 170 between the adjacent panels 32, 34 the fiber optics for each given panel in the vicinity of such border are angled toward the other panel. The angular degree is greatest closest to the border are 170 and becomes gradually less in the direction away from the border area. Alternatively other fiber optic configurations are used to overcome the discontinuity caused by border areas 170.

Meritorious and Advantageous Effects

One advantage of the invention is that an enlarged display screen is provided without significantly increasing the size of the computer case to be transported. Another advantage is that the movement into and out of the expanded viewing position is achieved automatically as the computer is open or closed.

Although a preferred embodiment of the invention has been illustrated and described, various alternatives, modifications and equivalents may be used. For example, although FIGS. 1–3 illustrate a display unit in which two display panels 32, 34 move in an alternative embodiment, one display panel is fixed, while the other display panel moves. In still other embodiments more than two display panels are included and at least two of the panels move to define a concatenated viewing area. Therefore, the foregoing description should not be taken as limiting the scope of the inventions which are defined by the appended claims.

What is claimed is:

1. A method for positioning component first and second display panels of a display unit, wherein a first extension is linked to the first display panel, and wherein a first member defines a first track for the first extension, the first member being fixed relative to a housing, the method comprising the steps of:

moving at least one of the first display panel and second display panel from a storage position in which the first display panel and second display panel have overlapping viewing areas into a viewing position in which the first display panel and second display panel have concatenated viewing areas defining at least a portion of a composite display screen; and moving at least one of the first display panel and second display panel from the viewing position into the storage position; and wherein each said step of moving comprises moving the first extension within the first track relative to the housing and the first display panel causing movement of the first display panel between the viewing position and the storage position.

2. The method of claim 1, in which the display unit comprises the first display panel, the second display panel and a display housing having a first peripheral edge; and wherein said step of moving into a viewing position comprises moving said at least one of the first display panel and second display panel in a first direction beyond the first peripheral edge; and wherein said step of moving into a storage position comprises moving said at least one of the first display panel and second display panel in a second direction opposite the first direction back within the first peripheral edge.

3. The method of claim 1, in which the display unit is part of a portable computer and rotates relative to a system unit between an open position for viewing the composite display screen and a closed position at which the display screen is blocked from view; wherein the step of moving into the viewing position occurs automatically as the display unit rotates relative to the system unit from the closed position into the open position.

4. The method of claim 3 and wherein the step of moving into the storage position occurs automatically as the display unit rotates relative to the system unit from the open position into the closed position.

5. A method for positioning component display panels of a composite display screen in a portable computer having a display unit which rotates relative to a system unit between an open position for viewing the display screen and a closed position at which the display screen is blocked from view, the display unit comprising a display housing, a first display panel and a second display panel, the system unit comprising a keyboard and a processor, the method comprising the steps of:

automatically moving at least one of the first display panel and second display panel from a storage position in which the first display panel and second display panel have overlapping viewing areas into a viewing position in which the first display panel and second display panel have concatenated viewing areas, wherein said step of moving from the storage position occurs as the display unit rotates relative to the system unit from the closed position into the open position; and automatically moving at least one of the first display panel and second display panel from the viewing position into the storage position as the display unit rotates relative to the system unit from the open position into the closed position; and wherein the display unit further comprises a post and the portable computer further comprises a cam defining a track within which the post moves, and wherein while the display unit rotates from the closed position to the open position a force derived from the rotation action is translated onto the post forcing the post to move along the track, and wherein the movement of the post along the track causes the automatic moving of said at least one display panel into the viewing position.

6. The method of claim 5, in which the display unit comprises the first display panel, the second display panel and a display housing having a first peripheral edge; and wherein said step of moving into a viewing position comprises moving said at least one of the first display panel and second display panel in a first direction beyond the first peripheral edge; and wherein said step of moving into a storage position comprises moving said at least one of the first display panel and second display panel in a second direction opposite the first direction back within the first peripheral edge.

7. A display unit defining a composite display screen comprising:

a first display panel;

a second display panel; and a housing defining a plurality of peripheral borders;

a first extension linked to the first display panel; and a first member defining a first track for the first extension, the first member being fixed relative to the housing, the first extension moving relative to the housing and the first display panel; and wherein at least one of the first display panel and second display panel moves relative to the housing between a storage position in which the first display panel and second display panel have overlapping viewing areas and a viewing position in which said at least one of the first display panel and second display panel extends beyond at least one of the plurality of peripheral borders; and wherein while in the viewing position the first display panel and second display panel have concatenated viewing areas defining at least a portion of the composite display screen; and wherein movement of the first display panel between the viewing position and the storage position said first extension moves within the first track.

8. The display unit of claim 7, in which said at least one of the first display panel and second display panel retract within said at least one of the plurality of peripheral borders while moving into the storage position.

9. A portable computing apparatus, comprising:

a system unit having a keyboard and processor;

a display unit attached to the system unit, the display unit rotating relative to the system unit between an open position for viewing a composite display screen and a closed position at which the display screen panel is blocked from view, wherein the display unit comprises a display housing, a first display panel and a second display panel, the display housing defining a defining a plurality of peripheral borders;

wherein at least one of the first display panel and second display panel moves relative to the display housing between a storage position and a viewing position;

wherein while in the storage position the first display panel and second display panel have overlapping viewing areas; and wherein while in the viewing position the first display panel and second display panel have concatenated viewing areas defining at least a portion of the composite display screen, and said at least one of the first display panel and second display panel extends beyond at least one of the plurality of peripheral borders; and further comprising a cam and in which the display unit further comprises an extension, the cam defining a track within which the extension moves; and wherein while the display unit rotates from the closed position to the open position a force derived from the rotation action is translated onto the extension forcing the extension to move along the track, and wherein the movement of the post along the track causes the automatic moving of said at least one display panel into the viewing position.

10. The apparatus of claim 9, in which said at least one of the first display panel and second display panel retract within said at least one of the plurality of peripheral borders while moving into the storage position.

11. The apparatus of claim 9, wherein while said display unit moves from the open position into the closed position, said at least one of the first display panel and second display panel automatically moves relative to the display housing from the viewing position into the storage position.

12. The apparatus of claim 9, wherein while said display unit moves from the closed position into the open position, said at least one of the first display panel and second display panel automatically moves relative to the display housing from the storage position into the viewing position.

13. The apparatus of claim 9, in which the extension is a first extension and the track is a first track, and in which the first display panel comprises a second extension, a third extension, and a fourth extension; and wherein the display unit further comprises:

a first member defining a second track for the second extension, the first member being fixed relative to the housing; and a second member defining a third track for the third extension and a fourth track for the first extension, the second member being fixed relative to the housing; and a link coupling the first extension to the fourth extension, wherein during the rotation of the display unit from the closed position into the open position, the force translated onto the first extension is further translated via the link to the fourth extension, said force on the fourth extension causing movement of the first display panel, and wherein during said movement of the first display panel the second extension moves within the second track, the third extension moves within the third track and the first extension moves within the fourth track.

* * * * *